(12) United States Patent
Benvegnu

(10) Patent No.: US 7,120,553 B2
(45) Date of Patent: Oct. 10, 2006

(54) ISO-REFLECTANCE WAVELENGTHS

(75) Inventor: Dominic J. Benvegnu, La Honda, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/898,065

(22) Filed: Jul. 23, 2004

(65) Prior Publication Data

US 2006/0020419 A1    Jan. 26, 2006

Related U.S. Application Data

(60) Provisional application No. 60/590,855, filed on Jul. 22, 2004.

(51) Int. Cl.
*G01B 11/02* (2006.01)

(52) U.S. Cl. ....................... 702/172; 702/159

(58) Field of Classification Search ................. 702/40, 702/159, 170–172
See application file for complete search history.

(56) References Cited

U.S. PATENT DOCUMENTS

| | | |
|---|---|---|
| 4,998,021 A | 3/1991 | Mimasaka |
| 5,081,796 A | 1/1992 | Schultz |
| 5,131,752 A | 7/1992 | Yu et al. |
| 5,413,941 A | 5/1995 | Koos et al. |
| 5,433,651 A | 7/1995 | Lustig et al. |
| 5,605,760 A | 2/1997 | Roberts |
| 5,640,242 A | 6/1997 | O'Boyle et al. |
| 5,658,183 A | 8/1997 | Sandhu et al. |
| 5,667,424 A | 9/1997 | Pan |
| 5,672,091 A | 9/1997 | Takahashi et al. |
| 5,791,969 A | 8/1998 | Lund |
| 5,838,447 A | 11/1998 | Hiyama et al. |
| 5,868,896 A | 2/1999 | Robinson et al. |
| 5,872,633 A | 2/1999 | Holzapfel et al. |
| 5,893,796 A | 4/1999 | Birang et al. |
| 5,949,927 A | 9/1999 | Tang |
| 5,956,142 A | 9/1999 | Muller et al. |
| 5,964,643 A | 10/1999 | Birang et al. |
| 6,010,538 A | 1/2000 | Sun et al. |
| 6,028,669 A | 2/2000 | Tzeng |
| 6,108,091 A | 8/2000 | Pecen et al. |
| 6,111,634 A | 8/2000 | Pecen et al. |
| 6,153,116 A | 11/2000 | Yang et al. |
| 6,159,073 A | 12/2000 | Wiswesser et al. |

(Continued)

FOREIGN PATENT DOCUMENTS

EP    881 040 A2    12/1998

(Continued)

OTHER PUBLICATIONS

Engelsrath and Loewenstein, "Uncertainties in the Optical Constants Determined from Isoreflectance Curves," Applied Optics, 1996, 5(4):565-567.

(Continued)

*Primary Examiner*—John Barlow
*Assistant Examiner*—Jonathan Moffat
(74) *Attorney, Agent, or Firm*—Fish & Richardson

(57) ABSTRACT

A method of measuring a physical characteristic of a patterned substrate comprises determining a wavelength where a first reflectance from a patterned substrate equals a second reflectance from the patterned substrate. The first and second reflectances are generated from substrate regions having different pattern densities. A physical characteristic value that is associated with the determined wavelength is identified. The value identification may be done by looking up the determined wavelength in a database, for example by referring to a graph.

25 Claims, 5 Drawing Sheets

U.S. PATENT DOCUMENTS

| | | |
|---|---|---|
| 6,247,998 B1 | 6/2001 | Wiswesser et al. |
| 6,307,628 B1 | 10/2001 | Lu et al. |
| 6,325,706 B1 | 12/2001 | Krusell et al. |
| 6,342,166 B1 | 1/2002 | Ide et al. |
| 6,374,150 B1 | 4/2002 | Redinbo et al. |
| 6,437,868 B1 | 8/2002 | Coult et al. |
| 6,494,765 B1 | 12/2002 | Gitis et al. |
| 6,501,555 B1 | 12/2002 | Ghandehare et al. |
| 6,511,363 B1 | 1/2003 | Yamane et al. |
| 6,514,775 B1 * | 2/2003 | Chen et al. ............... 438/8 |
| 6,547,458 B1 | 4/2003 | Janos et al. |
| 6,564,116 B1 | 5/2003 | Wang et al. |
| 6,586,262 B1 | 7/2003 | Saito et al. |
| 6,621,584 B1 | 9/2003 | Pecen et al. |
| 6,782,337 B1 * | 8/2004 | Wack et al. ............. 702/155 |
| 6,884,146 B1 * | 4/2005 | Lehman et al. ............. 451/5 |
| 6,895,360 B1 * | 5/2005 | Liu et al. .................. 702/172 |
| 2003/0022400 A1 * | 1/2003 | Nomoto et al. ............. 438/14 |

FOREIGN PATENT DOCUMENTS

| | | |
|---|---|---|
| EP | 881 484 A2 | 12/1998 |
| JP | 3-234467 | 10/1991 |

OTHER PUBLICATIONS

Müllerová and Mudroň, "Determination of Optical Parameters and Thickness of Thin Films Depositied on Absorbing Substates Using Their Reflection Spectra," acta physica slovaca, 2000, 50(4):477-488.

Regalado et al., "Angle scanning reflectometry: study of two characteristic isoreflectance angles," J. Phys. D: Appl. Phys., 1992, 25:1365-1370.

* cited by examiner

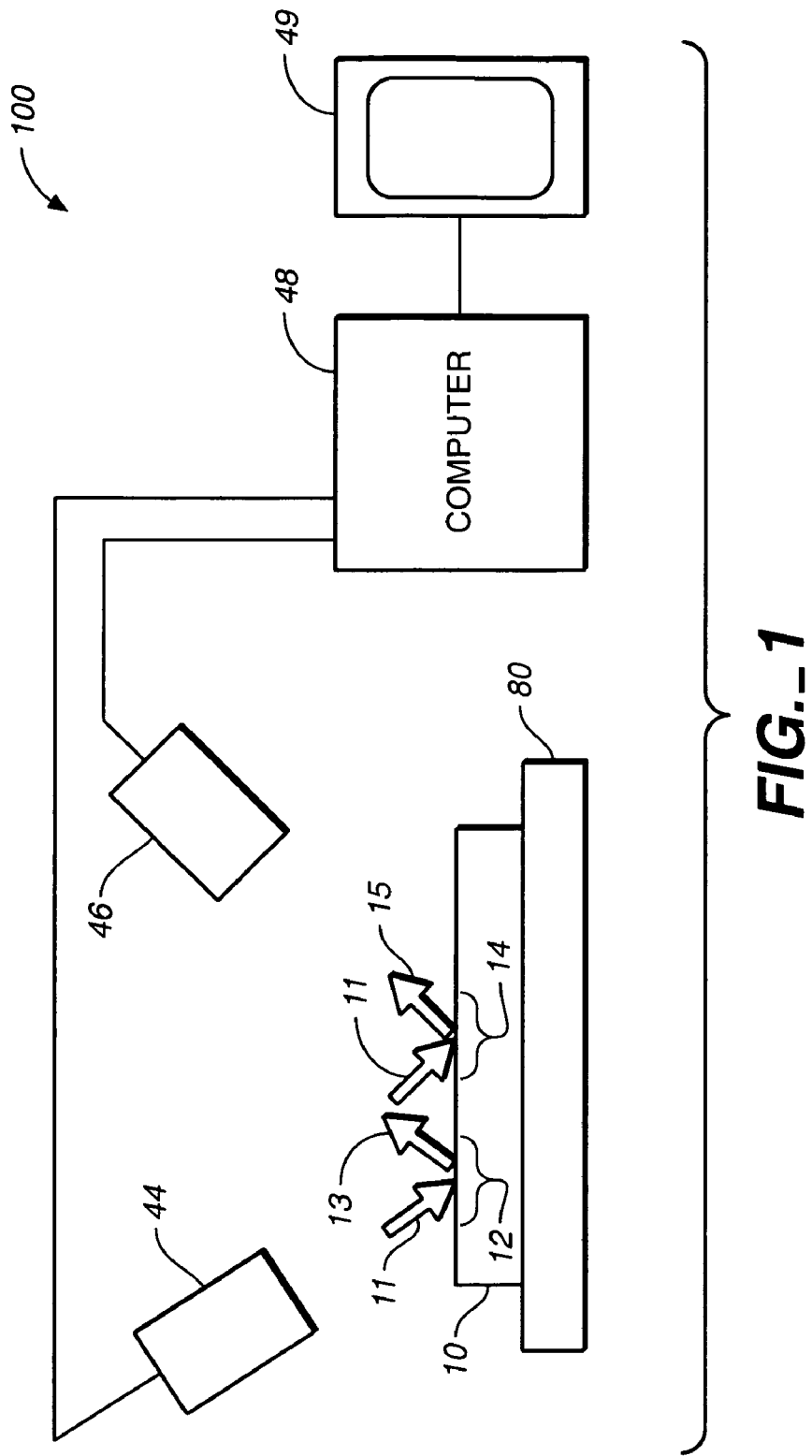
FIG._1

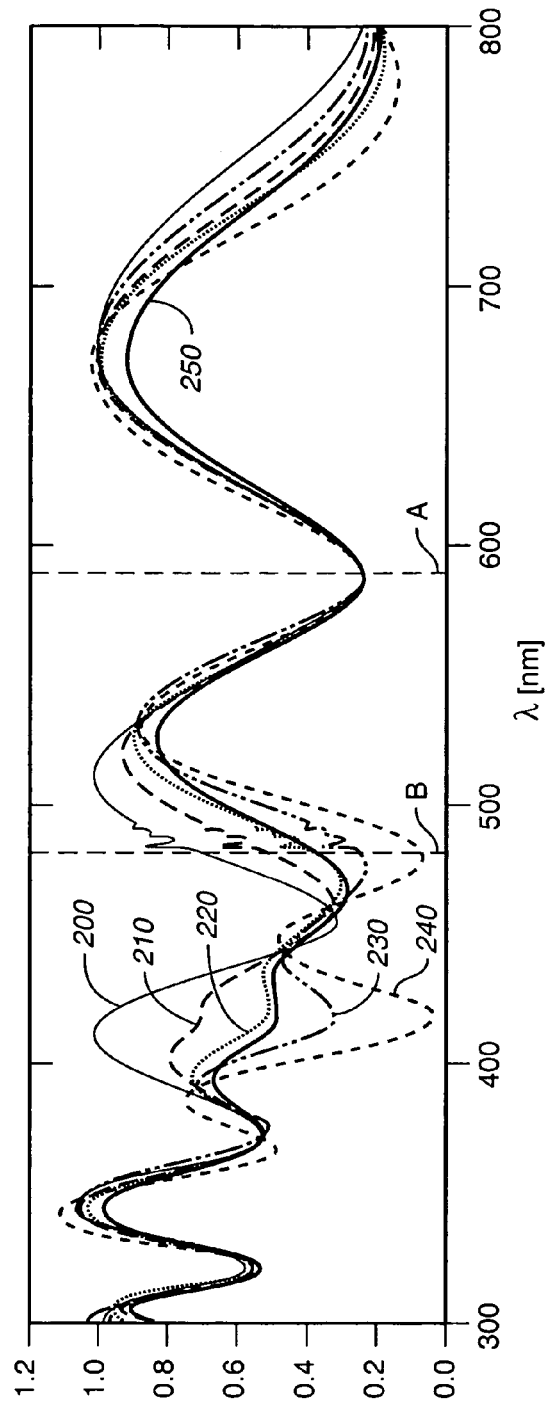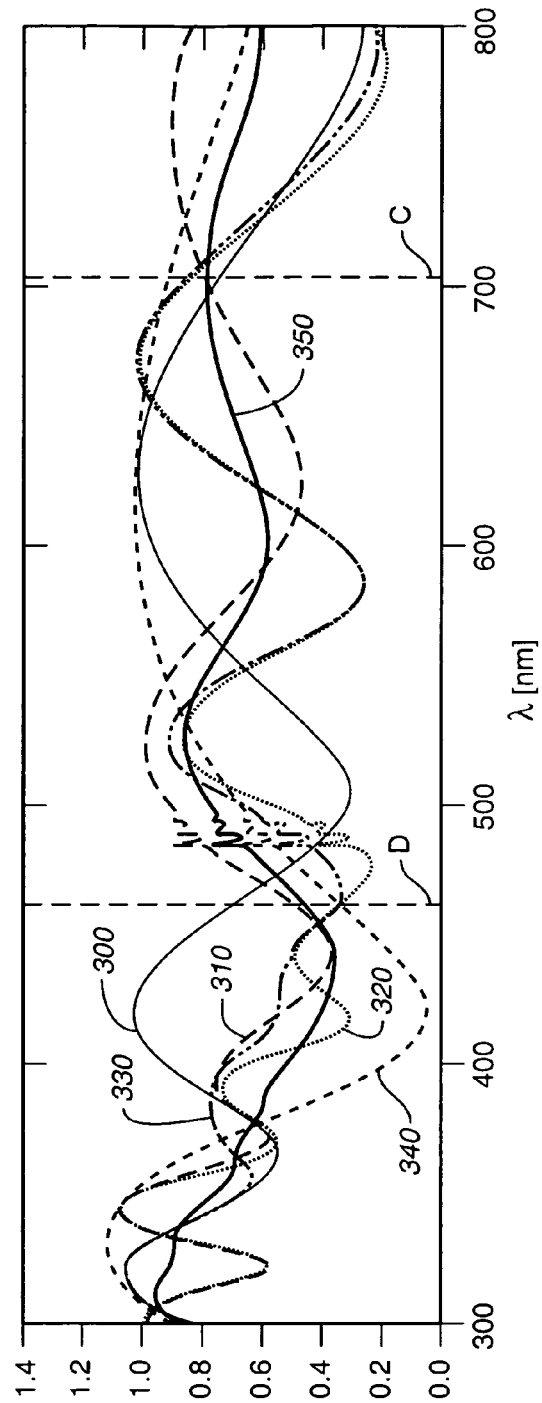

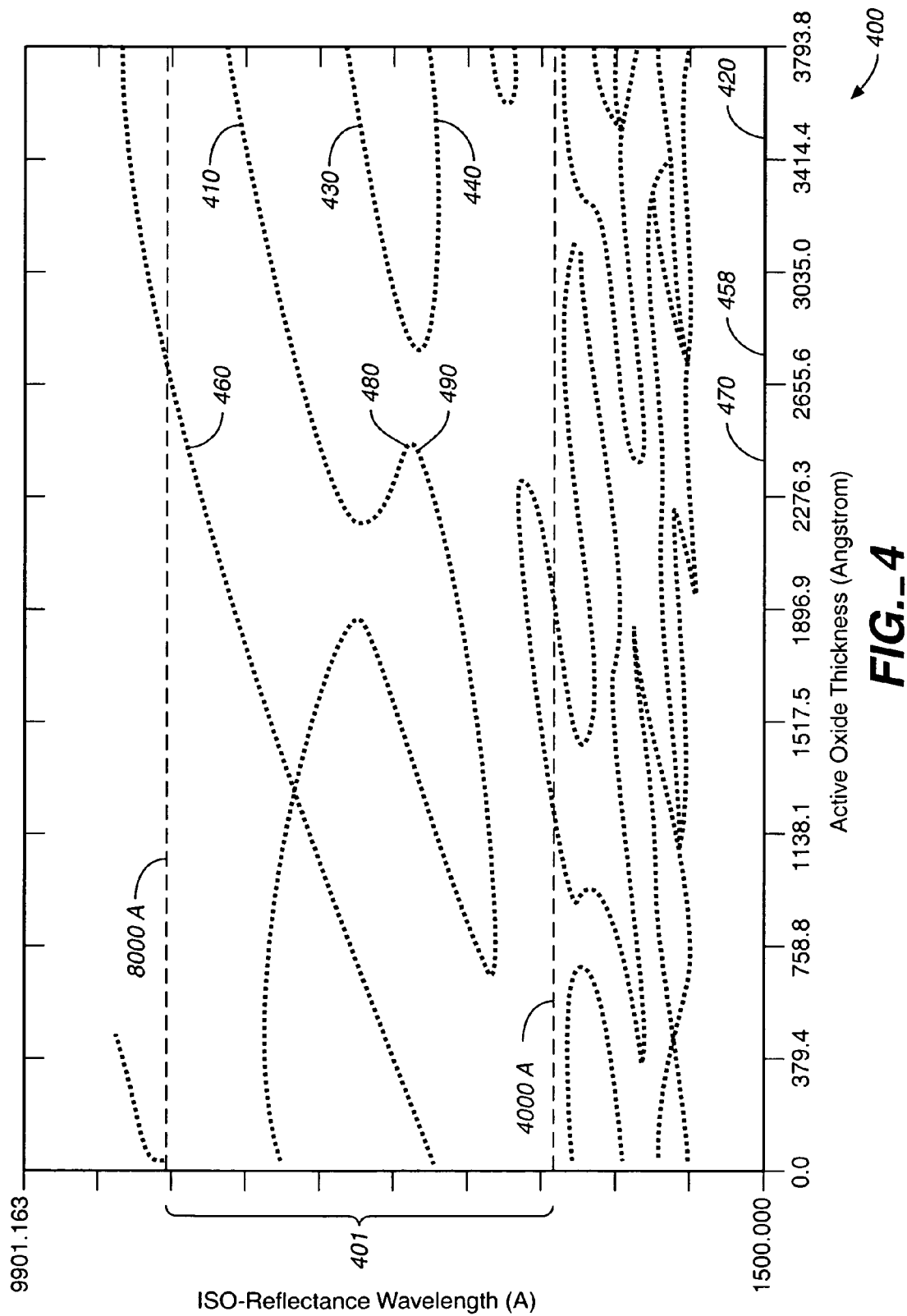
FIG._4

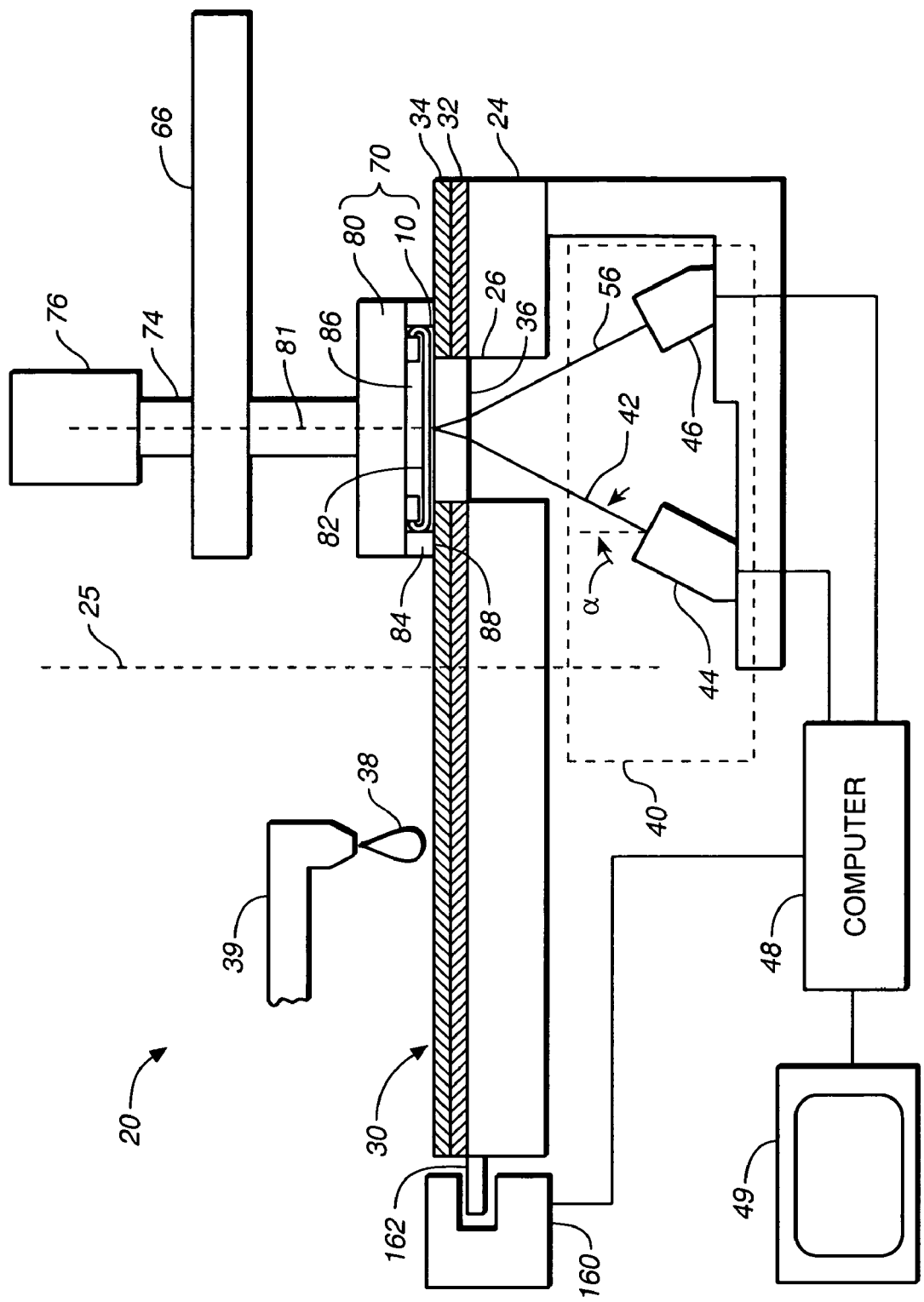
FIG._5

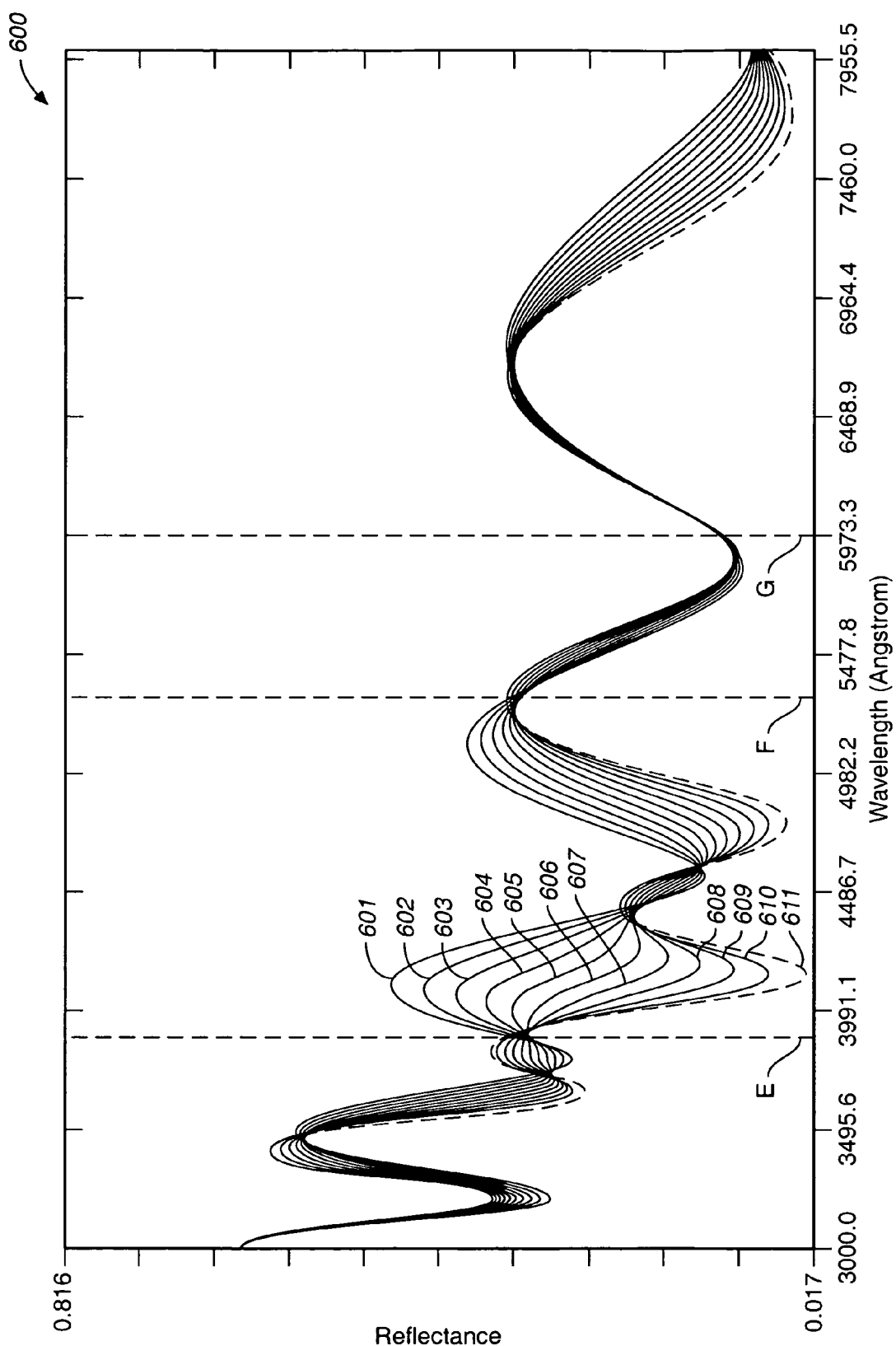
FIG._6

ISO-REFLECTANCE WAVELENGTHS

This application claims priority to U.S. application Ser. No. 60/590,855, filed on Jul. 22, 2004.

TECHNICAL FIELD

This description relates to use of iso-reflectance wavelengths in measuring a physical characteristic.

BACKGROUND

There are many situations in which light rays can be used for determining a physical characteristic of a material. For example, it is sometimes desirable to measure the thickness of a layer that is deposited on top of a substrate. That is, when a layer on top of a substrate is being planarized or otherwise partially removed in a polishing process, one may want to determine (directly or indirectly) the remaining thickness so that too much material is not removed. As another example, when a layer is being deposited on a substrate, one may want to determine (directly or indirectly) the deposited thickness so that too much or too little of the layer material is not deposited. Thus, the purpose of determining the thickness in some situations may be to determine a desired end point of a manufacturing process. In other examples, a physical characteristic such as thickness may be determined for quality control, classification, calibration, compatibility testing, or other purposes.

Chemical mechanical polishing (CMP) is one example of a manufacturing process in which end point determination is performed. For example, CMP is sometimes performed on a wafer or other substrate that includes integrated circuits. An integrated circuit is typically formed on a substrate by the sequential deposition of conductive, semiconductive or isolative layers on a silicon wafer. After each layer is deposited, the layer is etched to create circuitry features. As a series of layers are sequentially deposited and etched, the outer or uppermost surface of the substrate, i.e., the exposed surface of the substrate, becomes increasingly non-planar. This non-planar surface presents problems in the photolithographic steps of the integrated circuit fabrication process. The deposited layers must be planarized and then polished down to a specified thickness.

CMP is one accepted method of planarization. This planarization method typically requires that the substrate be mounted on a carrier or polishing head. The exposed surface of the substrate is placed against a rotating polishing pad. The polishing pad may be either a "standard" pad or a fixed-abrasive pad. A standard pad has a durable roughened surface, whereas a fixed-abrasive pad has abrasive particles held in a containment media. The carrier head provides a controllable load, i.e., pressure, on the substrate to push it against the polishing pad. A polishing slurry, including at least one chemically-reactive agent, and abrasive particles if a standard pad is used, is supplied to the surface of the polishing pad.

The effectiveness of a CMP process may be measured by its polishing rate, and by the resulting finish (absence of small-scale roughness) and flatness (absence of large-scale topography) of the substrate surface. The polishing rate, finish and flatness are determined by many factors, including the pad and slurry combination, the carrier head configuration, the relative speed between the substrate and pad, and the force pressing the substrate against the pad.

In order to determine the effectiveness of different polishing tools and processes, a so-called "blank" wafer, i.e., a wafer with multiple layers but no pattern, may be polished in a tool/process qualification step. After polishing, the remaining layer thickness may be measured at several points on the substrate surface. The variation in layer thickness provide a measure of the wafer surface uniformity, and a measure of the relative polishing rates in different regions of the substrate. One approach to determining the substrate layer thickness and polishing uniformity is to remove the substrate from the polishing apparatus and examine it. For example, the substrate may be transferred to a metrology station where the thickness of the substrate layer is measured, e.g., with an ellipsometer. Unfortunately, this process can be time-consuming and thus costly, and the metrology equipment is costly.

One problem in CMP is determining whether the polishing process is complete, i.e., whether a substrate layer has been planarized to a desired flatness or thickness. Many different factors can cause variations in the material removal rate, including variations in the initial thickness of the substrate layer, the slurry composition, the polishing pad condition, the relative speed between the polishing pad and the substrate, and the load on the substrate. These variations in turn cause variations in the time needed to reach the polishing endpoint. Therefore, the polishing endpoint cannot be determined merely as a function of polishing time.

One way to determine the polishing endpoint is to remove the substrate from the polishing surface and examine it. For example, the substrate may be transferred to a metrology station where the thickness of a substrate layer is measured, e.g., with an ellipsometer. If the desired specifications are not met, the substrate is reloaded into the CMP apparatus for further processing. This is a time consuming procedure that reduces the throughput of the CMP apparatus. Alternatively, the examination might reveal that an excessive amount of material has been removed, rendering the substrate unusable.

Several methods have been developed for in-situ polishing endpoint detection. Some of these methods may involve monitoring a parameter associated with the substrate surface, and indicating an endpoint when the parameter abruptly changes. For example, where an isolative or dielectric layer is being polished to expose an underlying metal layer, the coefficient of friction and the reflectivity of the substrate will change abruptly when the metal layer is exposed. Other endpoint detection methods involve impinging a light beam on the substrate and analyzing the light that reflects off the surface. Such analyses may involve monitoring interference fringes in the reflected light or registering how reflectance varies with an angle of incident polarized light.

However, reflectance from a patterned substrate, such as a wafer with integrated circuitry, may depend on a density of the substrate pattern in the area where the light beam impinges. When a light beam impinges on a patterned substrate, light reflected from a high pattern-density area may have a different reflectivity than light reflected from a low pattern-density area. Measurements based on reflectivity therefore may contain noise introduced by the variance in pattern density across the patterned substrate. Accordingly, it may be difficult to compare measurements taken at different locations on the patterned substrate. Moreover, when doing in situ measurements, the accurate location on the wafer may not be known, which further complicates the measurement.

SUMMARY

The systems and techniques described here relate to iso-reflectance wavelengths. In a first general aspect, a method of measuring a physical characteristic of a patterned substrate comprises determining a wavelength where a first reflectance from a patterned substrate equals a second reflectance from the patterned substrate, the first and second reflectances being generated from substrate regions having different pattern densities. A physical characteristic value that is associated with the determined wavelength is determined.

In selected embodiments, a plurality of reflectances from the patterned substrate including the first and second reflectances are measured. Determining the wavelength where the first reflectance equals the second reflectance may comprise an approximation of where the plurality of reflectances are equal.

In selected embodiments, identifying the physical characteristic value involves comparing the determined wavelength with a database of wavelengths as a function of the physical characteristic. The physical characteristic may be a layer thickness and the database may comprise a graph reflecting how the wavelengths are associated with the layer thickness.

In a second general aspect, a method of measuring a thickness of a layer on a patterned substrate comprises directing a light beam at a first region of a layer on a patterned substrate. A first reflectance spectrum produced by the light beam reflecting off the first region is recorded. The light beam is directed at a second region of the layer that has a different pattern density than the first region. A second reflectance spectrum produced by the light beam reflecting off the second region is recorded. A wavelength where the first and second reflectance spectra intersect is determined. A layer thickness that is associated with the determined wavelength is determined.

In a third general aspect, an apparatus for measuring a physical characteristic of a patterned substrate comprises a light source that generates a light beam to impinge on at least first and second substrate regions having different pattern densities. The apparatus comprises a sensor that receives a first reflectance generated from the first substrate region and a second reflectance generated from the second substrate region. The apparatus comprises a processor configured to identify a physical characteristic value that is associated with a wavelength where the first reflectance equals the second reflectance.

In a fourth general aspect, a method of selecting a wavelength for measuring a physical characteristic of a patterned substrate comprises calculating a first reflectance for a patterned substrate, the first reflectance being calculated for a first pattern density of the patterned substrate. The method comprises calculating a second reflectance for the patterned substrate, the second reflectance being calculated for a second pattern density of the patterned substrate. A wavelength where the first reflectance equals the second reflectance is selected, wherein light of the selected wavelength is to be used in measuring a physical characteristic of the patterned substrate.

In selected embodiments, calculating the first and second reflectances involves generating a first spectrum for the first reflectance and a second spectrum for the second reflectance, and selecting the wavelength by identifying where the first spectrum equals the second spectrum.

In selected embodiments, light of the selected wavelength is used in determining a layer thickness of the patterned substrate.

Advantages of the systems and techniques described herein may include any or all of the following: Improved monitoring of a physical characteristic in a patterned substrate; improved end point detection in a manufacturing process; reduction or elimination of reflectance variations that depend on pattern density; improved thickness determination in thin films; improved selection of wavelength for light to be used in determining a physical characteristic of a patterned substrate; and reduced influence of pattern density on a thickness mesaurement.

BRIEF DESCRIPTION OF DRAWINGS

FIG. 1 is a block diagram of an apparatus that measures a physical characteristic of a patterned substrate;

FIG. 2 is a graph of reflectance spectra from an unpolished patterned wafer;

FIG. 3 is a graph of reflectance spectra from a polished patterned wafer;

FIG. 4 is a graph of simulated iso-reflectance points associated with layer thicknesses;

FIG. 5 is a block diagram of a system that measures a physical characteristic of a patterned wafer; and FIG. 6 is a graph of calculated reflectances that can be used in selecting a wavelength for light to be used in determining a physical characteristic of a patterned substrate.

Like reference symbols in the various drawings indicate like elements.

DETAILED DESCRIPTION

FIG. 1 is a block diagram of an apparatus 100 that measures a physical characteristic of a patterned substrate 10. For example, the substrate 10 may be a wafer that includes integrated circuitry. Particularly, the patterned substrate 10 may include active regions and trench regions, which are well-known in the area of semiconductor manufacturing. As is also well-known, the substrate 10 may be covered by an oxide layer that covers both the active regions and the trench regions. The apparatus 100 can be used for measuring a thickness of a layer on a substrate, for example such as an oxide layer. In this example, the substrate 10 is located on a carrier 80.

The apparatus 100 includes a light source 44 for producing a light beam to impinge on the substrate 10, and a detector 46 for receiving light that is reflected off the substrate 10. For example, the light source 44 may be a light bulb that produces white light, such as light that is essentially within the ultraviolet (UV) to infrared (IR) wavelength range. In selected embodiments, a wavelength range of 2800–15000 Angstrom (A) may be used. In some implementations, the light source 44 is a Tungsten or Mercury lamp. Optionally, light source 44 includes fiber optics for guiding the produced light beam onto the substrate 10. The detector 46 may be a spectro-photometer that measures reflectance from the patterned substrate 10. In some implementations, the detector 46 includes an array of silicon diodes as is well-known. The detector 46 is capable of measuring reflectance over a range of wavelengths.

The light source 44 produces a light beam 11 that impinges on the substrate 10 in a first region 12. The region 12 has a specific pattern density that may or may not be known. That is, region 12 may include active region only, or trench region only, or some portions of active region and some portions of trench region. In any given region, the proportion between active and trench regions determines the pattern density. For example, the ratio of active region to the total area of region 12 may be used as a measure of pattern density, such that 100 percent density corresponds to "all active region" and 0 percent density corresponds to "all trench region." Other definitions of pattern density may be used.

A reflected light beam 13 emerges from the substrate 10 as a result of the incident light beam 11. The reflected light beam 13 is generated in the first region 12 and may, as is well-known, consist of light that is reflected from several different layers in the substrate 10. That is, when the substrate 10 consists of several layers with different refractions indices, each boundary between layers may give rise to a light reflection that contributes to the overall reflected light beam 13.

The detector 46 detects the reflected light beam 13 and transmits corresponding information to a computer 48 that may also be connected to the light source 44. The detector 46 may detect reflectances from the substrate 10 over a wavelength interval, for example, 3500–8000 A. For example, the detector 46 transmits information to the computer 48 that can be graphically displayed as a reflectance spectrum over the registered wavelength range.

The light beam 11 is also caused to impinge on a second region 14 of the pattern substrate 10 that has a different pattern density than the first region 12. This may be accomplished by redirecting the angle of light source 44, by relocating the light source 44, by relocating the substrate 10, or by any combination of these. The purpose of impinging the light beam 11 on the second region 14 is to have a second reflected light beam 15 be generated from a region with different pattern density than the first region 12. While the second region 14 has a different pattern density, it is not necessary to know whether its density is higher or lower than that of region 12, or to know absolute values of the densities.

In certain embodiments, the regions 12 and 14 are reserved areas of the patterned substrate 10 that are intended mainly for reflectance measurements as described herein. In certain implementations, the regions 12 and 14 may be produced as scribe lines of the patterned substrate 10. As another example, the regions 12 and 14 in some implementations may comprise circles in a round wafer. For example, the regions 12 and 14 may have 0 percent and 100 percent pattern density, respectively. In a polishing process where the substrate 10 is moving during the measurement, it may be difficult to determine the exact location on the substrate where the reflected light beam originates. However, the native wafer pattern and layout will contain regions of differing pattern density, and a random scan across the wafer will usually guarantee that regions of different density are encountered. While measurements from two regions 12 and 14 are described in this example, a greater number of measurements may be made. For example, one can measure light that is reflected from multiple regions that have different patterned density, such as pattern regions with densities in the range 0, 10, 20, . . . , 100 percent.

The second reflected light beam 15 is detected by detector 46 and corresponding information transmitted to the computer 48 similarly to the first reflected beam 13. These measured reflectances can be used for measuring a physical characteristic of the patterned substrate 10, as will now be described.

FIGS. 2 and 3 are graphs of reflectance spectra measured from different substrates using the apparatus 100. Such graphs can be analyzed to identify one or more wavelengths where the reflectances from regions of different pattern densities are equal. These wavelengths can be used to identify a physical characteristic value for the patterned substrate.

The reflectances in the exemplary FIG. 2 are measured from an unpolished wafer. That is, they were obtained from a wafer having a coating such as an oxide layer that has not yet been subjected to a polishing process such as a CMP. The wavelengths are indicated on the horizontal axis labeled λ. The unit for the wavelength in this example is nanometers (nm) and this graph ranges from about 300–800 nm. The magnitude of the reflectances is measured against the vertical axis in the graph, which in this example is a normalized scale. That is, the reflectances are not displayed in absolute values but as the ratio between the measured reflectance and the intensity of the incoming light beam. Alternatively, absolute values may be used.

The graph in FIG. 2 includes reflectances measured from five regions of different pattern densities. Reflectance 200 is generated from a region with 0 percent pattern density; that is, an all trench region. Reflectance 210 is generated from a region with 30 percent pattern density; that is, a region with 30 percent active region and 70 percent trench region. Similarly, reflectance 220 is generated from a region with 50 percent pattern density, reflectance 230 from a region with 70 percent pattern density and reflectance 240 from a region with 100 percent pattern density. Reflectance 250 is an average of reflectances 200–240.

Some or all of the reflectances 200–240 intersect in various places of the graph. That is, there are wavelengths at which the reflectances from different regions are equal. This means that the reflectance from the patterned substrate 10 at these wavelengths is independent of pattern density. They may therefore be referred to as "iso-reflectance" wavelengths. Identifying one or more iso-reflectance wavelengths and using them to determine a physical characteristic may reduce or eliminate the variance that may otherwise be introduced by the differences in pattern density.

For example, it is seen that the reflectances 200–240 essentially intersect at a wavelength A just below 600 nm. The wavelength A may be considered an iso-reflectance wavelength because the measured reflectances are equal there and not dependent on pattern density. A different wavelength B, in contrast, would not be considered an iso-reflectance wavelength because the measured reflectances differ greatly depending on the pattern density of the regions from which they are generated. Accordingly, using the iso-reflectance wavelength in determining a physical characteristic value may reduce or eliminate the influence of varying pattern density throughout substrate 10.

Similarly, FIG. 3 is a graph of reflectances measured from another substrate. In this example, the substrate is a polished wafer including integrated circuitry. These reflectances are measured from respective regions that have essentially the same pattern densities as the regions that generated the reflectances 200–240. Thus, the reflectance 300 is generated from a region with 0 percent pattern density; reflectance 310 from a region with 30 percent pattern density; reflectance 320 from a region with 50 percent pattern density; reflectance 330 from a region with 70 percent pattern density; and reflectance 340 from a region with 100 percent pattern density. Reflectance 350 is an average of reflectances 300–340.

There is more variation between the individual reflectances in FIG. 3 than in FIG. 2. This may be because the polishing of the substrate is near or at its end point, that is, the polishing is essentially complete. Nevertheless, it is possible to identify wavelengths where the reflectances 300–340 are very close to each other if not equal. For example, wavelength C just above 700 nm may be considered an iso-reflectance wavelength.

It may also be possible to identify an iso-reflective wavelength where fewer than all of the measured reflectances intersect. For example, the reflectances 320, 330 and 340 intersect at wavelength D, intermediate between 400 and 500 nm. Thus, one can select the intersection of fewer than all multiple reflectances as an approximation of where the reflectances are equal.

The purpose of determining one or more iso-reflectance wavelengths (A, C, and D in the above examples) is to look up this wavelength in a database that associates particular physical characteristic values with individual iso-reflectance wavelengths. That is, the location of an iso-reflectance wavelength in the measured wavelength range (approximately 300–800 nm in FIGS. 2 and 3) may be indicative of a physical characteristic of the patterned substrate, such as a thickness of an oxide layer on top of the substrate. The database of wavelengths associated with physical characteristics values may be created by computer simulation. That is, one can create a computer model that, based on input parameters of relevant known values of the patterned substrate, generates a simulated distribution of iso-reflectance wavelengths for different values of the physical characteristic.

Such a simulation may be based on a well-known equation that gives reflectance (R) as a function of the incident light and of properties of a number of dielectric layers in a substrate:

$$R_q = \frac{|E_{p+1}^-|^2}{|E_{p+1}^+|^2} = \frac{\left|\cos g_p\left(1 - \frac{u_{p-1}}{u_{p+1}}\right) + i \sin g_p\left(\frac{u_{p-1}}{u_p} - \frac{u_p}{u_{p+1}}\right)\right|^2}{\left|\cos g_p\left(1 + \frac{u_{p-1}}{u_{p+1}}\right) + i \sin g_p\left(\frac{u_{p-1}}{u_p} + \frac{u_p}{u_{p+1}}\right)\right|^2} \quad (1)$$

wherein $$g_p = \frac{2\pi}{\lambda} h_p n_p \cos\theta_p$$

$$\begin{cases} u_p = n_p \cos\theta_p, \text{ for "}s\text{" light} \begin{pmatrix} \text{normal to the plane} \\ \text{of incident light} \end{pmatrix} \\ u_p = \frac{n_p}{\cos\theta_p}, \text{ for "}\ell\text{" light} \begin{pmatrix} \text{parallel to the plane} \\ \text{of incident light} \end{pmatrix} \end{cases}$$

$q = $ "$s$" or "$l$"

$n_p = N_p + iK_p$, where $N_p, K_p$ are index of refraction and absorption coefficient for layer $p$.

$\lambda = $ wavelength $i = \sqrt{-1}$ $E_{p+1}^+, E_{p+1}^-$    The incident and reflected electric field vector $j$    Index for each layer(0, 1, ..., $p$, $p+1$)

$p$    Number of dielectric layers in the stack $h_j$    Thickness of layer $j$ $\theta_j$    The angel of incidence in layer $j$ See, for example, Warren J. Smith, Modem Optical Engineering 192ff (McGraw-Hill 1990).

Eq.(1) gives reflectance as a function of the properties of the dielectric layer(s). All of the terms on the right side of eq.(1) [i.e. $\cos g_p$, $\sin g_p$, and all the u's] are, in general, complex numbers because the index of refraction of each layer, $n_j$, is in general a complex number.

In computing reflectance spectra for a given wafer, two regions are considered, each with a different dielectric stack: (a) the active region, and (b) the trench (or isolation) region. For a reflectance measurement at a given spot on the wafer, the reflected light may be composed of some light that has interacted with the active region, and some light that has interacted with the trench region.

The computed reflectance spectrum for a given pattern density may be obtained by taking a linear combination of the 0% and 100% spectra at each wavelength:

$$R_f(\lambda) = f \cdot R_{100}(\lambda) + (1-f) \cdot R_0(\lambda) \quad (2)$$

wherein $R_{100}$ and $R_0$ are the reflectances at wavelength $\lambda$ of the active and trench regions, respectively f is the pattern density (range 0 to 100)

At those wavelengths for which $R_{100}$ equals $R_0$, the reflectance is the same for both active and trench regions. At these wavelengths, called iso-reflectance wavelengths, the reflectance is the same for all pattern densities, as expressed in Eq(3).

$$\text{If } R_{100}(\lambda_{iso}) = R_0(\lambda_{iso}) \equiv R_{iso}, \text{ then } R_f(\lambda_{iso}) = R_{iso} \text{ for all pattern densities.} \quad (3)$$

To simulate by computer the iso-reflectance wavelengths for a given oxide thickness, one may proceed as follows. The pattern density affects Eq.(1) through the parameters that reflect the composition of the layers in the substrate. That is, active regions typically have different stacks of dielectric materials than trench regions, for example. One may therefore select pattern densities of 0 percent (all trench) and 100 percent (all active) for the simulation. Eq.(1) is then evaluated for a given oxide thickness (the thickness $h_j$ of the uppermost layer on the substrate), separately for the active and trench regions. If the reflectance value given by Eq.(1) is the same for both regions, the particular wavelength is an iso-reflectance wavelength. One may then proceed to evaluate all wavelengths in a range of interest, such as 3,500–8,000 A, for the particular oxide thickness, and record any identified iso-reflectances. When this is done, one may decrease the oxide layer parameter in Eq.(1) by an arbitrary amount and repeat the process. Eventually, one obtains a data collection that specifies, for a number of different oxide thicknesses, the iso-reflectance wavelength(s) existing in the selected wavelength range. Such a data collection can be stored on a database and can be displayed as a graph showing iso-reflectance wavelength(s) as a function of oxide thickness.

FIG. 4 is based on a data collection that can be obtained using Eq.(1) as just described. FIG. 4 shows an exemplary graph 400 that sets forth iso-reflectance wavelengths (IRW) as a function of active oxide thickness (AOT). In other words, by knowing one or more specific IRWs, one can look up the AOT that is associated with the wavelength(s) in the graph 400. This lookup can be done once or several times. For example, the lookup can be done once when the measured thickness is not expected to change significantly thereafter. As another example, several lookups can be done during a process that changes the layer thickness, such as during a CMP.

The AOT in graph 400 is measured against the horizontal axis and in this example ranges from about zero A to about 3800 A. The IRWs are measured against the vertical axis, which in this example runs from about 1500 A to about 9900

A. This example uses IRWs in the range 4000–8000 A, and a range 401 is therefore marked with dashed lines. Every data point in the graph 400 represents a predicted IRW for this particular substrate.

Essentially, the graph 400 may be used as follows in a CMP. First, an approximate initial value for the AOT of the unpolished wafer is often known. For example, the approximate initial AOT may be determined based on the particular process used in manufacturing the patterned wafer. This gives a "starting point" in the graph 400. Assume that the starting point for AOT in graph 400 is approximately 3800 A; that is, at the right end of the graph. After CMP has been performed for some time, one can measure the IRW to determine the new AOT. Assume that three IRWs are found in the 4000–8000 A range, and that the highest of them is about 7000 A. One may then identify one or more iso-reflectance points (IRPs) for these IRWs in graph 400. Beginning at the right side of graph 400 and moving left (because the AOT decreases during CMP), one finds an IRP 410 that is presently at approximately 7000 A. The IRP 410 is associated with an AOT 420 that is approximately 3500 A. At the AOT 420, the graph 400 predicts that there will be two other IRPs 430 and 440 in the range 401. One may then confirm that the other two measured IRWs fit the IRWs predicted by graph 400. If they do, this indicates that the patterned substrate currently has the AOT 420.

The IRPs may not remain at the same wavelength during CMP. Rather, graph 400 shows that the wavelength of IRPs 410, 430 and 440 will decrease (at different rates) as the AOT is reduced. This decrease in wavelength can be used to confirm that the CMP is progressing as expected. At an AOT 450, however, the IRPs 430 and 440 will no longer be distinguishable from each other. That is, they reach the same wavelength and, as the AOT is thereafter further reduced, there is no more IRP in this specific area of range 401. The "disappearance" of particular IRPs from the graph 400 can be used to localize where in the graph the CMP currently is, so that the corresponding AOT can be read. The IRP 410 still exists at AOT 450, and there is another IRP 460 that has "entered" the range 401 from the upper wavelength regions. Thus, from AOT 450 and some time forward in the CMP, one can track the movements of IRPs 410 and 460. But IRPs may appear or disappear throughout the CMP. At AOT 470, for example, two additional IRPs 480 and 490 will appear at almost the same wavelength. As the CMP progresses, the IRP 480 will increase in wavelength (until it "merges" with IRP 410) and the IRP 490 will decrease in wavelength.

Typically, a CMP is carried out until the AOT is reduced down to a predetermined level. Accordingly, when at least one IRP that is currently being monitored in graph 400 indicates that the desired AOT has been reached, this indicates the endpoint at which the CMP should be terminated.

The graph 400 may be derived from a data collection stored in a database. For example, the associations between AOTs and one or more IRW's may be stored in a table such that, for any given IRW, one can look up the AOT associated therewith. If more than one AOT is associated with the IRW, this ambiguity can be resolved by knowing the initial AOT and how long the CMP has been performed, because approximate removal rates are generally known.

The thickness of an oxide layer is one example of a physical characteristic value that can be measured using the techniques described herein. Other physical characteristics that can be associated with iso-reflectance wavelengths can also be measured. For example, Eq.(1) depends on several physical characteristics besides the thickness of an oxide layer, and one can create a graph analogous to FIG. 4 by identifying iso-reflectance wavelengths for values of another physical characteristic.

It has been mentioned above that the determination of iso-reflectance wavelengths and subsequent identification of an associate physical value may be performed during a manufacturing process. In such implementations, the measurement of the particular physical characteristic may be used to determine an end point of the manufacturing process. To provide in situ thickness monitoring during CMP, the apparatus 100 described with reference to FIG. 1 can be incorporated into a polishing system, for example as shown in FIG. 5.

FIG. 5 shows a CMP apparatus 20 in which one or more substrates 10 can be polished. For example, a Shallow Trench Isolation (STI) process could produce the substrate 10. The CMP apparatus includes a rotatable platen 24 on which is placed a polishing pad 30. This may be a two-layer polishing pad with a hard durable outer surface or a relatively soft pad. If substrate 10 is an "eight-inch" (200 millimeter) or "twelve-inch" (300 millimeter) diameter disk, then the platen and polishing pads will be about twenty inches or thirty inches in diameter, respectively. The platen 24 may be connected to a platen drive motor (not shown). For most polishing processes, the platen drive motor rotates platen 24 at thirty to two hundred revolutions per minute, although lower or higher rotational speeds may be used.

Polishing pad 30 typically has a backing layer 32 which abuts the surface of platen 24 and a covering layer 34 which is used to polish substrate 10. Covering layer 34 is typically harder than backing layer 32. However, some pads have only a covering layer and no backing layer. Covering layer 34 may be composed of an open cell foamed polyurethane or a sheet of polyurethane with a grooved surface. Backing layer 32 may be composed of compressed felt fibers leached with urethane. A two-layer polishing pad, with the covering layer composed of IC-1000 and the backing layer composed of SUBA-4, is available from Rodel, Inc., of Newark, Del. (IC-1000 and SUBA-4 are product names of Rodel, Inc.).

The CMP apparatus 20 may include one or more carrier head systems 70, optionally mounted on a rotatable multi-head carousel (not shown). The carrier head system is supported by a support plate 66. The carrier head system includes a carrier or carrier head 80. A carrier drive shaft 74 connects a carrier head rotation motor 76 to each carrier head 80 so that each carrier head can independently rotate about it own axis. In addition, each carrier head 80 independently laterally oscillates. For example, a slider (not shown) may support each drive shaft in its associated radial slot, and a radial drive motor (not shown) may move the slider to laterally oscillate the carrier head.

The carrier head 80 performs several mechanical functions. Generally, the carrier head holds the substrate against the polishing pad, evenly distributes a downward pressure across the back surface of the substrate, transfers torque from the drive shaft to the substrate, and ensures that the substrate does not slip out from beneath the carrier head during polishing operations.

Carrier head 80 may include a flexible membrane 82 that provides a mounting surface for substrate 10, and a retaining ring 84 to retain the substrate beneath the mounting surface. Pressurization of a chamber 86 defined by flexible membrane 82 forces the substrate against the polishing pad. Retaining ring 84 has a lower surface 88 which may reflect light.

A slurry 38 containing a reactive agent (e.g., deionized water for oxide polishing) and a chemically-reactive catalyzer (e.g., potassium hydroxide for oxide polishing) may be supplied to the surface of polishing pad 30 by a slurry supply port or combined slurry/rinse arm 39. If polishing pad 30 is a standard pad, slurry 38 may also include abrasive particles (e.g., silicon dioxide for oxide polishing).

In operation, the platen is rotated about its central axis 25, and the carrier head is rotated about its central axis 81 and translated laterally across the surface of the polishing pad. A hole 26 is formed in platen 24 and a transparent window 36 is formed in a portion of polishing pad 30 overlying the hole. Hole 26 and transparent window 36 are positioned such that they have a view of substrate 10 during a portion of the platen's rotation, regardless of the translational position of the carrier head.

An optical system 40 is secured to platen 24 generally beneath hole 26 and rotates with the platen. The system includes the light source 44 and the detector 46. The light source generates a light beam 42 which propagates through transparent window 36 and slurry 38 to impinge upon the exposed surface of substrate 10. The light beam 42 is projected from light source 44 at an angle $\alpha$ from an axis normal to the surface of substrate 10, i.e., at an angle $\alpha$ from axes 25 and 81. In addition, if the hole 26 and window 36 are elongated, a beam expander (not illustrated) may be positioned in the path of the light beam to expand the light beam along the elongated axis of the window.

Light source 44 may operate continuously. Alternately, it may be activated to generate light beam 42 during a time when hole 26 is generally adjacent substrate 10. CMP apparatus 20 may include a position sensor 160, such as an optical interrupter, to sense when window 36 is near the substrate. For example, the optical interrupter could be mounted at a fixed point opposite carrier head 80. A flag 162 is attached to the periphery of the platen. The point of attachment and length of flag 162 is selected so that it interrupts the optical signal of sensor 160 from a time shortly before window 36 sweeps beneath carrier head 80 to a time shortly thereafter. The output signal from detector 46 may be measured and stored while the optical signal of sensor 160 is interrupted.

In operation, light source 44 may generate the light beam 42 to impinge on the substrate 10. The detector 46, in turn, receives a light beam 56 that is reflected off the substrate 10. The detector 46 may transmit corresponding information about the reflected light beam 56 to the computer 48. Information received or processed by the computer 48 may be output on the display device 49.

During the polishing process, the light beam 44 impinges on substrate regions with different pattern density. Respective reflectance spectra for the different regions are registered. For example, reflectances from the different regions are measured in close proximity to each other, such as during a single platen revolution. The computer 48 can identify one or more iso-reflectance wavelengths in the reflectance spectra. The computer 48 can look up the identified wavelength in a database of layer thicknesses associated with iso-reflectance wavelengths, for example a table containing the information shown in FIG. 4. The measured thickness is the thickness that the database associates with the identified iso-reflectance wavelength. When the computer 48 determines that the endpoint of the CMP process has been reached, it can terminate the CMP by deactivating the CMP apparatus 20.

An embodiment of an inventive method may be used in selecting a wavelength for measuring a patterned substrate. Assume, for example, that one wants to use a system similar to the system 100 shown in FIG. 1 to measure a layer thickness of the substrate 10. One well-known way of doing this is to irradiate the substrate 10 with an essentially single-wavelength (or monochrome) light, and determine the thickness using a technique that involves monitoring interference fringes in reflected light, or registering how reflectance varies with an angle of polarized light, to name just two examples. However, methods that involve registering light that is reflected from a patterned substrate may be sensitive to variations in pattern density across the substrate. It may therefore be advantageous to select, for such a procedure, light having a wavelength that reduces the influence that different pattern densities have on reflectance.

Selecting such a wavelength may be done as follows. Simulated reflectance spectra may be calculated for at least two different pattern densities of a particular substrate. A wavelength where the at least two reflectances are equal may then be selected for use in determining a physical characteristic of the substrate.

For example, Eq. (1) may be used in calculating the reflectances. That is, one may enter the stack parameters for a first substrate region (such as an active region) in the equation and calculate a reflectance spectrum. The particular pattern density of the first substrate region is introduced into the equation by the stack parameters. Similarly, one may enter the stack parameters for a second substrate region (such as a trench region) in the equation and calculate another reflectance spectrum. Optionally, this procedure may be done for a plurality of different pattern densities, such that a plurality of reflectances are obtained. Eq. (1) can be implemented in any kind of computer system to provide a computer modeling of reflectance as a function of wavelength and stack parameters.

FIG. 6 shows a graph 600 that can be obtained through a computer implemented modeling. The graph 600 includes eleven reflectances 601–611, each of which corresponds to a specific pattern density. Each of the reflectances 601–611 is obtained using Eq. (1). Graph 600 shows reflectance on the vertical axis (in an arbitrary unit) as a function of wavelength on the horizontal axis (in A). Here, each of the reflectances 601–611 is shown in a range from about 3,000 A to about 7,950 A.

The reflectances 601–611 intersect at a number of wavelengths, such as at the wavelengths marked E, F and G. Accordingly, the computer modeling indicates that the reflectance at these wavelengths is independent of pattern density. It may therefore be advantageous to use any of those wavelengths when irradiating a substrate, because this may reduce the influence of pattern density on reflectance.

In existing systems, Eq. (1) is sometimes used for determining, for a single pattern density, the wavelength that would produce the highest level of reflectance. That wavelength may then be selected for use in measuring the substrate. However, the graph 600 shows that a local maximum for one reflectance can be a local minimum for another. For example, this is the case at approximately 4,000 A for the reflectances 601 (maximum) and 611 (minimum). Accordingly, an approach based on maximizing reflectance may lead to significant noise due to the different pattern densities. Moreover, the exemplary graph 600 shows that the wavelengths of equal reflectance, such as the wavelengths E,F and G, do not always coincide with wavelengths where any of the reflectances 601–611 have local maxima.

A wavelength selected by identifying where reflectances calculated for different pattern densities are equal may be used in determining a physical characteristic of the patterned substrate. A CMP apparatus can be provided with a light source for the selected wavelength. For example, the CMP apparatus 20 shown in FIG. 5 can be caused to use the selected wavelength in measuring the patterned substrate 10. That is, the optical system 40 can be configured such that the light beam 42 has the selected wavelength. The reflected light beam 56 can be received by the detector 46 and analyzed according to the particular measurement technique that is being used. For example, the light beam 42 with the selected wavelength can be used to measure a layer thickness of the substrate 10.

A number of embodiments of the invention have been described. Nevertheless, it will be understood that various modifications may be made without departing from the spirit and scope of the invention. Accordingly, other embodiments are within the scope of the following claims.

I claim:

1. A method of measuring a physical characteristic of a patterned substrate, the method comprising:
   receiving a first reflectance spectrum and a second reflectance spectrum measured from the patterned substrate, the first and second reflectance spectra being generated from substrate regions having different pattern densities;
   determining, after receiving the first and second reflectance spectra, a wavelength where the first reflectance spectrum equals the second reflectance spectrum;
   identifying a physical characteristic value that is associated with the determined wavelength; and
   reporting or storing an indication of the identified physical characteristic value.

2. The method of claim 1, wherein the physical characteristic is a thickness of a layer above a pattern in the patterned substrate.

3. The method of claim 1, wherein the wavelength is determined and the physical characteristic value is identified during a manufacturing process.

4. The method of claim 3, further comprising repeating the wavelength determination and the value identification until an endpoint of the manufacturing process is reached.

5. The method of claim 1, wherein the substrate regions having different pattern densities are located in respective reserved areas of the patterned substrate.

6. The method of claim 5, wherein each of the reserved areas comprise at least one selected from the group consisting of: a scribe line and a circle in the patterned substrate with known radius.

7. The method of claim 1, wherein a plurality of reflectance spectra from the patterned substrate including the first and second reflectance spectra are measured, and wherein determining the wavelength where the first reflectance spectrum equals the second reflectance spectrum comprises an approximation of where the plurality of reflectance spectra are equal.

8. The method of claim 1, further comprising determining multiple wavelengths where the first reflectance spectrum equals the second reflectance spectrum, the multiple wavelengths corresponding to iso-reflectance points for the patterned substrate.

9. The method of claim 8, further comprising monitoring wavelengths of the iso-reflectance points over time.

10. The method of claim 9, wherein the iso-reflectance points increase or decrease in number over time.

11. The method of claim 10, further comprising using the increase or decrease in the number of iso-reflectance points to determine an endpoint of a manufacturing process involving the patterned substrate.

12. The method of claim 1, wherein the first and second reflectance spectra are measured during a CMP process.

13. The method of claim 12, wherein the first and second reflectance spectra are measured during a single platen revolution.

14. The method of claim 1, wherein identifying the physical characteristic value involves comparing the determined wavelength with a database of wavelengths as a function of the physical characteristic.

15. The method of claim 14, wherein the physical characteristic is a layer thickness and wherein the database comprises a graph reflecting how the wavelengths are associated with the layer thickness.

16. A method of measuring a thickness of a layer on a patterned substrate, the method comprising:
   directing a light beam at a first region of the layer on the patterned substrate;
   recording a first reflectance spectrum produced by the light beam reflecting off the first region;
   directing the light beam at a second region of the layer that has a different pattern density than the first region;
   recording a second reflectance spectrum produced by the light beam reflecting off the second region;
   determining, after recording the first and second reflectance spectra, a wavelength where the first and second reflectance spectra intersect;
   identifying a layer thickness that is associated with the determined wavelength; and
   reporting or storing an indication of the identified layer thickness.

17. The method of claim 16, wherein the wavelength is determined and the layer thickness is identified during a manufacturing process, and wherein the method further comprises repeating the wavelength determination and layer thickness identification until an endpoint of the manufacturing process is reached.

18. The method of claim 16, wherein the first and second regions comprise at least one selected from the group consisting of: a scribe line and a circle in the patterned substrate with known radius.

19. The method of claim 16, wherein the light beam is essentially within a wavelength range of UV light to IR light.

20. An apparatus for measuring a physical characteristic of a patterned substrate, the apparatus comprising:
   a light source that generates a light beam to impinge on at least first and second substrate regions having different pattern densities;
   a sensor that receives a first reflectance spectrum generated from the first substrate region and a second reflectance spectrum generated from the second substrate region; and
   a processor configured to identify, after the sensor receives the first and second reflectance spectra, a physical characteristic value that is associated with a wavelength where the first reflectance spectrum equals the second reflectance spectrum.

21. The apparatus of claim 20, wherein the processor identifies the physical characteristic value by comparing the determined wavelength with a database of simulations where every simulation wavelength is associated with at least one simulation value.

22. The apparatus of claim 20, wherein the processor repeatedly performs identification during a manufacturing process, and wherein the processor interrupts the manufacturing process at an endpoint identified using the physical characteristic value.

23. The apparatus of claim 20, wherein the light beam is essentially within a wavelength range of UV light to IR light.

24. A computer program product tangibly embodied in a computer-readable storage device, the computer program product including instructions that, when executed, cause a processor to perform operations comprising:
  receiving a first reflectance spectrum and a second reflectance spectrum measured from a patterned substrate, the first and second reflectance spectra being generated from substrate regions having different pattern densities;
  determining, after receiving the first and second reflectance spectra, a wavelength where the first reflectance spectrum equals the second reflectance spectrum;
  identifying a physical characteristic value that is associated with the determined wavelength; and
  reporting or storing an indication of the identified physical characteristic value.

25. A computer program product tangibly embodied in a computer-readable storage device, the computer program product including instructions that, when executed, cause a processor to perform operations comprising:
  directing a light beam at a first region of a layer on a patterned substrate;
  recording a first reflectance spectrum produced by the light beam reflecting off the first region;
  directing the light beam at a second region of the layer that has a different pattern density than the first region;
  recording a second reflectance spectrum produced by the light beam reflecting off the second region;
  determining, alter recording the first and second reflectance spectra, a wavelength wherein the first and second reflectance spectra intersect;
  identifying a layer thickness that is associated with the determined wavelength; and
  reporting or storing an indication of the identified layer thickness.

* * * * *